United States Patent
Yamada

(10) Patent No.: US 8,591,673 B2
(45) Date of Patent: Nov. 26, 2013

(54) MARTENSITIC STAINLESS STEEL AND ANTIFRICTION BEARING USING THE SAME

(75) Inventor: Hiroshi Yamada, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 204 days.

(21) Appl. No.: 12/549,888

(22) Filed: Aug. 28, 2009

(65) Prior Publication Data

US 2010/0054649 A1 Mar. 4, 2010

(30) Foreign Application Priority Data

Sep. 1, 2008 (JP) ................................. 2008-223246
Jun. 9, 2009 (JP) ................................. 2009-138507

(51) Int. Cl.
*C22C 38/22* (2006.01)

(52) U.S. Cl.
USPC ............................................ 148/325; 420/64

(58) Field of Classification Search
USPC ............................................ 420/64; 148/325
See application file for complete search history.

(56) References Cited

U.S. PATENT DOCUMENTS

| | | | |
|---|---|---|---|
| 2,590,835 A | * | 4/1952 | Sykes et al. ................. 420/37 |
| 6,143,425 A | | 11/2000 | Tanaka et al. |
| 6,409,846 B1 | | 6/2002 | Takemura et al. |
| 2002/0164260 A1 | | 11/2002 | Koga et al. |
| 2004/0040631 A1 | | 3/2004 | Takahashi et al. |
| 2005/0271541 A1 | | 12/2005 | Hamano et al. |
| 2007/0187002 A1 | | 8/2007 | Takahashi et al. |

FOREIGN PATENT DOCUMENTS

| | | |
|---|---|---|
| EP | 0 638 658 A1 | 2/1995 |
| EP | 0 748 878 A1 | 12/1996 |
| EP | 1 215 366 A2 | 6/2002 |
| EP | 1 304 393 A1 | 4/2003 |
| EP | 1 602 740 A1 | 12/2005 |
| JP | 10-121209 A | 5/1998 |
| JP | 2000226641 A * | 8/2000 |
| JP | 2001-049277 A | 2/2001 |
| JP | A 2001-271144 | 10/2001 |

OTHER PUBLICATIONS

NPL: Machine translation of JP2000226641A, Aug. 2000.*
Mar. 23, 2011 Search Report issued in European Application No. 09011219:4-1215/2159295.

* cited by examiner

*Primary Examiner* — Jie Yang
(74) *Attorney, Agent, or Firm* — Oliff & Berridge, PLC

(57) ABSTRACT

A martensitic stainless steel with high hardness and high corrosion resistance consists of, by weight %, 0.35 to 0.45% of C, not more than 0.2% of Si, not more than 0.3% of Mn, not more than 0.02% of P, not more than 0.02% of S, 15 to 17% of Cr, 1.5 to 2.5% of Mo, 0.001 to 0.003% of B, 0.15 to 0.25% of N, and the balance of Fe and inevitable impurities.

10 Claims, 2 Drawing Sheets

ST: Solution treatment
AG: Aging treatment

MARTENSITIC STAINLESS STEEL AND ANTIFRICTION BEARING USING THE SAME

RELATED APPLICATIONS

This application claims priority under 35 U.S.C. §119 to Japanese Patent Application Nos. JP2008-223246 filed on Sep. 1, 2008 and JP2009-138507 filed on Jun. 9, 2009, the entire contents of which are hereby incorporated by reference.

BACKGROUND OF THE INVENTION

1. Field of the Invention

The present invention relates to a martensitic stainless steel that has superior corrosion resistance as well as superior cold workability and hot workability, and therefore the stainless steel is unlikely to crack during forging and has high levels of strength.

2. Description of the Related Art

A martensitic stainless steel, such as SUS440A, SUS440B, SUS440C and the like, is conventionally used for bearings, such as slide bearings and antifriction bearings, gears, bolts, dies, punches, cutting tools, etc., which require high hardness and wear resistance. This kind of stainless steel is disclosed in, for example, Japanese Unexamined Patent Application Laid-open No.2002-256397.

The above-mentioned martensitic stainless steels, such as SUS440A, SUS440B and SUS440C, include a large amount of carbon in order to achieve high hardness after heat treatment. Therefore, in comparison with an austenitic stainless steel such as SUS304 and SUS316, these martensitic stainless steels are inferior in corrosion resistance, and tend to rust when exposed for long time to an environment with large amount of moisture and/or salt. Moreover, because these martensitic stainless steels include a large amount of carbon, cracks may occur in forging or after quenching or sub-zero treatment. A coating treatment on a surface may be used as a means for preventing rust, but in some cases, adhesion of the coating material to the base material is low, or the production cost is increased.

Since eutectic carbides are generated in the above-described martensitic stainless steels, cold workability and corrosion resistance of the martensitic stainless steels are inferior to those of an austenitic stainless steel such as SUS316.

Antifriction bearings may be used in a corrosive environment. For example, antifriction bearings for submersible pumps, fishing reels, and the like, may suffer adhesion of moisture or salt. Accordingly, the material of such antifriction bearings is required to have high corrosion resistance in addition to high hardness. In this case, a corrosion-resistant stainless steel like SUS440C is commonly used. However, as described before, although the SUS440C is a stainless steel achieving high hardness after heat treatment, it still has low corrosion resistance when compared to the austenitic stainless steel such as SUS304 and SUS316. Therefore, if SUS440C is subjected to the above-described corrosive environment for long time, rust will occur, and the bearing life will be decreased.

SUMMARY OF THE INVENTION

Accordingly, it is an object of the present invention to provide a martensitic stainless steel having better corrosion resistance and cold workability compared to those of SUS440C and, at the same time, a satisfactory hardness after heat treatment, a superior wear resistance, a reduced amount of residual austenite and a small variation in dimensions due to aging. In particular, the present invention relates to a martensitic stainless steel that may be preferably used as a material of antifriction bearings for products such as submersible pumps and fishing reels which are subjected to a corrosive environment where, for example, adhesion of moisture or salt may occur. In addition, the present invention relates to an antifriction bearing that does not easily rust and has a long service life even in corrosive environments.

The inventor of the present invention conducted intensive development of a martensitic stainless steel so as to achieve the above object, and found the following. A martensitic stainless steel was prepared so as to include, by weight, not more than 0.2% of Si, not more than 0.3% of Mn, not more than 0.02% of P, not more than 0.02% of S, 15 to 17% of Cr, 1.5 to 2.5% of Mo, 0.001 to 0.003% of B, and 0.15 to 0.25% of N with respect to the amount of C in a specific range and also to include the balance of Fe and inevitable impurities. By quenching, sub-zero treatment and tempering the martensitic stainless steel, a martensitic stainless steel having a hardness not less than HRC 60 was obtained. The obtained martensitic stainless steel contained a small amount of residual austenite and showed small variation in dimensions as it ages. This martensitic stainless steel may be preferably used for antifriction bearings that are used in a corrosive environment.

In the first aspect of the present invention, the martensitic stainless steel of the present invention is based on the above findings, and the martensitic stainless steel consists of, by weight %, 0.35 to 0.45% of C, not more than 0.2% of Si, not more than 0.3% of Mn, not more than 0.02% of P, not more than 0.02% of S, 15 to 17% of Cr, 1.5 to 2.5% of Mo, 0.001 to 0.003% of B, 0.15 to 0.25% of N, and the balance of Fe and inevitable impurities.

In a second aspect of the present invention, by further adding 0.1 to 0.2 weight % of W to the martensitic stainless steel as an additional component for the composition of the first aspect, a martensitic stainless steel having increased strength and toughness is obtained.

In a third aspect according to the first or the second aspect of the present invention, since the amount of C is as small as 0.35 to 0.45%, the sum of CW and NW is set to be in a range of 0.60 to 0.65%, wherein CW represents the amount of C and NW represents the amount of N, both in weight %. As a result, a martensitic stainless steel having further increased hardness after heat treatment is obtained.

In a fourth aspect of the present invention, the martensitic stainless steel of the first, second, or third aspect of the present invention is used as a bearing material. By quenching, performing sub-zero treatment, and tempering the bearing material, an antifriction bearing having a hardness of not less than HRC 60 is obtained. The antifriction bearing of the present invention has superior corrosion resistance, cold workability and wear resistance compared to those of a bearing using SUS440C, and the antifriction bearing contains a small amount of residual austenite and will not greatly vary in dimensions as it ages. Moreover, the antifriction bearing of the present invention may be preferably used in a corrosive environment.

The martensitic stainless steel of the present invention consists of, by weight %, 0.35 to 0.45% of C, not more than 0.2% of Si, not more than 0.3% of Mn, not more than 0.02% of P, not more than 0.02% of S, 15 to 17% of Cr, 1.5 to 2.5% of Mo, 0.001 to 0.003% of B, 0.15 to 0.25% of N, and the balance of Fe and inevitable impurities. In the above martensitic stainless steel, the amount of carbon is 0.35 to 0.45% which is small compared with that of SUS440C, but strength and toughness thereof can be improved by adding 0.1 to 0.2 weight % of W. Moreover, when the amount of C is represented as CW and the amount of N is represented as NW, by setting the total of CW and NW to be in a range of 0.60 to 0.65%, the hardness of the martensitic stainless steel can achieve HRC 60 or more after quenching, sub-zero treatment and tempering.

The reasons for the amounts of alloy components (chemical elements) in the present invention are described hereinafter. It should be noted that in the following description the symbol "%" represents "weight percent". In the present invention, besides the following components, Fe and inevitable impurities are included in the martensitic stainless steel as the balance.

C (Carbon): 0.35 to 0.45%

C is an austenite-forming element. If C is added in large amount, eutectic carbides tend to be generated and cracks are more likely to occur, whereby sufficient corrosion resistance is not obtained. Therefore, the upper limit of the amount of C is set to be 0.45%. In order to obtain high hardness of not less than HRC 60 after heat treatment, not less than 0.60% of the total amount of C and N is necessary, as explained later. In addition, as the possible upper limit of the amount of N is 0.25% when melting in air, the lower limit of the amount of C is set to be 0.35%.

Si (Silicon): not more than 0.2%

If Si is added at more than 0.2%, toughness is greatly decreased, which adversely affects hot workability. Therefore, Si is added at not more than 0.2%.

Mn (Manganese): not more than 0.3%

Mn is an austenite-stabilizing element. Therefore, if Mn is added in excess, the amount of residual austenite is increased, whereby hardness after heat treatment and corrosion resistance are decreased, and dimensional change tends to occur as it ages. Accordingly, the amount of Mn is set to be not more than 0.3%.

P (Phosphorus): not more than 0.02%

P is an element that precipitates at crystal grain boundaries and causes cold brittleness. Therefore, the amount of P is set to be not more than 0.02% in order to avoid the cold brittleness.

S (Sulfur): not more than 0.02%

Since S can decrease corrosion resistance and hot workability, the amount of S is set to be not more than 0.02%.

Cr (Chromium): 15 to 17%

Cr increases the solid solubility limit of N, similarly to the effect of Mn, and improves corrosion resistance when added at not less than 13%. In the present invention, since the amount of C is set to be in a low range of 0.35 to 0.45%, the amount of Cr is increased so as to improve corrosion resistance, and the lower limit of Cr is set to be 15%. On the other hand, in order to reliably generate a strong passivation film and to reliably obtain austenite single phase at a temperature of quenching, the upper limit of the amount of Cr is set to be 17%. If Cr is added at more than 17%, $M_{23}C_6$ type carbides corresponding to carbides of Cr and Fe are generated, which will decrease hardness after heat treatment and corrosion resistance.

Mo (Molybdenum): 1.5 to 2.5%

Mo increases the solid solubility limit of N, which is similar to the effect of Cr, and improves corrosion resistance and hardenability. In order to obtain these effects, addition of Mo at not less than 1.5% is required. On the other hand, toughness is decreased if an excess amount of Mo is added. Therefore, the upper limit of the amount of Mo is set to be 2.5%.

N (Nitrogen): 0.15 to 0.25%

N is an element that is very effective for improving hardness after heat treatment and corrosion resistance of a martensitic stainless steel (BN is precipitated due to N, and thus, strength can be improved, as described later). In order to obtain these effects, not less than 0.15% of N is required. In a case of melting in air, the solid solubility limit of N is 0.25% so as to form a martensitic stainless steel for practical use without generating blowholes (bubbles) in the material. Therefore, the upper limit of the amount of N is set to be 0.25%.

$0.60\% \leq (CW+NW) \leq 0.65\%$ (CW: the amount of C, NW: the amount of N)

In order to obtain not less than HRC 60 hardness by quenching, sub-zero treatment, and tempering, the total of CW and NW is required to be not less than 0.60%. On the other hand, if the total of CW and NW is more than 0.65%, residual austenite is increased, and hardness after heat treatment is decreased. Therefore, the upper limit of the total of CW and NW is set to be 0.65%.

B (Boron): 0.001 to 0.003%

Addition of B is effective for improving strength and hardenability since BN is precipitated. In order to obtain these effects, addition of not less than 0.001% of B is required. On the other hand, toughness is decreased if an excess amount of B is added. Therefore, the upper limit of the amount of B is set to be 0.003%.

The essential components of the alloy according to the present invention are described above. However, the alloy of the present invention can additionally include the following components.

W (Tungsten): 0.1 to 0.2%

Since W has a large atomic radius, W functions as a solid-solution strengthening element. In order to obtain the effect, addition of not less than 0.1% of W is required. However, toughness is decreased if excess amount of W is added. Therefore, the upper limit of the amount of W is set to be 0.2%.

As clearly shown in Table 2, the martensitic stainless steel of the present invention has superior corrosion resistance and cold workability, and also has a sufficient hardness after heat treatment and superior wear resistance. Moreover, the martensitic stainless steel of the present invention includes a small amount of residual austenite, has small change in dimensions due to aging, and does not crack in quenching and in subsequent sub-zero treatment. Accordingly, when this martensitic stainless steel is used as a material for parts, parts with reduced cost, high reliability and long service life are obtained, and the industrial benefits are considerable. As such parts, bearings like slide bearings and antifriction bearings, gears, bolts, dies, punches and cutting tools, which require high hardness after heat treatment, wear resistance, and corrosion resistance, may be mentioned. Specially, the martensitic stainless steel of the present invention may be preferably used for a material of bearings used in corrosive environments containing much moisture or salt, such as bearings of fishing reels.

DETAILED DESCRIPTION OF THE PREFERRED EMBODIMENTS

Examples

Figure 1:
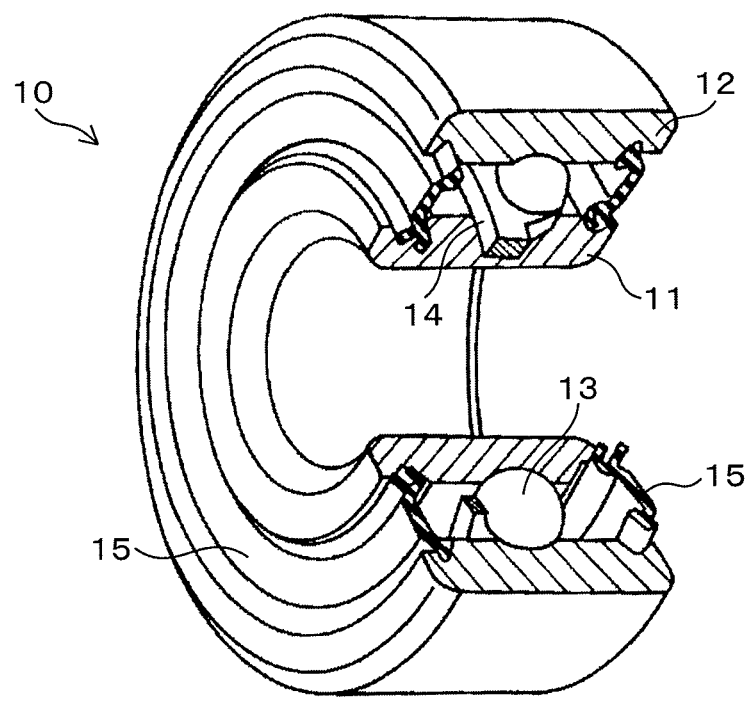
FIG. 1 is a perspective view of a ball bearing in a practical example using a martensitic stainless steel of the present invention.

The present invention will hereinafter be illustrated by way of the practical examples that are not to be considered as limiting its scope.

Each alloy having a chemical composition (weight %) shown in Table 1 was melted and was homogeneously heated by a high-frequency induction furnace having a capacity of 10 kg. Each of the alloys was solidified into an ingot, and the ingots were cut and were formed into a round bar with a diameter of 20 mm by hot forging. The round bars were maintained at 1100° C. for 1 hour, then cooled by water, and subjected to a sub-zero treatment in liquid nitrogen. Next, the round bars were subjected to low-temperature tempering at 150° C., whereby samples of practical examples 1 to 5 and comparative examples 1 to 13 were obtained. All of these samples included Fe and inevitable impurities as the balance in addition to the compositions shown in Table 1.

observed by visual inspection, and the corrosion resistance was considered as being "Unsatisfactory" when rust was observed by visual inspection.

Verification of Existence of $M_{23}C_6$ Type Carbides

The test piece was mounted in resin and was then polished. The polished surface of the test piece was observed by using a metallurgical microscope at a magnification of 1000, and then, the presence of $M_{23}C_6$ type carbides was checked.

Hot Workability

Hot workability was evaluated in such a way that hot workability was considered as being "Unsatisfactory" when a crack occurred at an edge of the sample in blooming and hot

TABLE 1

| | Chemical composition of samples (weight %) | | | | | | | | | | | | |
|---|---|---|---|---|---|---|---|---|---|---|---|---|---|
| | C | Si | Mn | P | S | Cr | Mo | Ni | Cu | W | B | N | CW + NW |
| Practical example 1 | 0.41 | 0.13 | 0.25 | 0.010 | 0.008 | 16.1 | 2.10 | | | | 0.0012 | 0.21 | 0.62 |
| Practical example 2 | 0.41 | 0.18 | 0.23 | 0.009 | 0.009 | 16.2 | 2.00 | | | | 0.0018 | 0.19 | 0.60 |
| Practical example 3 | 0.42 | 0.14 | 0.22 | 0.008 | 0.008 | 16.1 | 1.90 | | | 0.12 | 0.0023 | 0.20 | 0.62 |
| Practical example 4 | 0.39 | 0.13 | 0.24 | 0.009 | 0.009 | 15.9 | 1.95 | | | | 0.0026 | 0.21 | 0.60 |
| Practical example 5 | 0.40 | 0.15 | 0.24 | 0.010 | 0.010 | 16.0 | 2.00 | | | 0.13 | 0.0028 | 0.20 | 0.62 |
| Comparative example 1 | 0.28 | 0.16 | 0.22 | 0.008 | 0.008 | 16.1 | 2.10 | | | 0.11 | | 0.21 | 0.49 |
| Comparative example 2 | 0.41 | 0.25 | 0.23 | 0.009 | 0.009 | 16.2 | 2.10 | | | 0.11 | 0.0018 | 0.22 | 0.63 |
| Comparative example 3 | 0.40 | 0.18 | 0.38 | 0.010 | 0.008 | 15.9 | 2.22 | | | | 0.0017 | 0.19 | 0.59 |
| Comparative example 4 | 0.40 | 0.15 | 0.23 | 0.009 | 0.009 | 13.9 | 2.20 | | | 0.12 | 0.0018 | 0.22 | 0.62 |
| Comparative example 5 | 0.41 | 0.13 | 0.22 | 0.008 | 0.008 | 17.8 | 2.10 | | | | | 0.26 | 0.67 |
| Comparative example 6 | 0.39 | 0.15 | 0.23 | 0.007 | 0.009 | 16.3 | 1.30 | | | | | 0.22 | 0.61 |
| Comparative example 7 | 0.42 | 0.14 | 0.25 | 0.008 | 0.009 | 16.1 | 4.00 | | | | 0.0016 | 0.21 | 0.63 |
| Comparative example 8 | 0.41 | 0.14 | 0.23 | 0.010 | 0.008 | 16.2 | 2.00 | | | | | 0.13 | 0.54 |
| Comparative example 9 | 0.42 | 0.13 | 0.25 | 0.010 | 0.009 | 15.9 | 2.10 | | | | 0.0016 | 0.29 | 0.71 |
| Comparative example 10 | 0.38 | 0.15 | 0.23 | 0.009 | 0.009 | 16.3 | 2.05 | | | | 0.0009 | 0.23 | 0.61 |
| Comparative example 11 | 0.44 | 0.17 | 0.25 | 0.008 | 0.008 | 16.2 | 2.10 | | | 0.13 | 0.0031 | 0.22 | 0.65 |
| Comparative example 12 | 0.39 | 0.15 | 0.22 | 0.007 | 0.007 | 15.8 | 1.98 | 0.53 | | | 0.0011 | 0.21 | 0.60 |
| Comparative example 13 | 0.41 | 0.16 | 0.21 | 0.008 | 0.009 | 16.1 | 2.01 | | 0.49 | | 0.0012 | 0.22 | 0.63 |

The following tests were performed on the samples of the practical examples 1 to 5 and the comparative examples 1 to 13.

Measurement of Hardness (HRC) after Tempering

Hardness was measured by the Rockwell hardness C-scale as prescribed in Japanese Industrial Standards (JIS) Z2245.

Evaluation of Corrosion Resistance

A neutral salt spray test was performed for 24 hours according to the method prescribed in JIS Z2371, and then corrosion resistance was evaluated on the basis of two evaluation levels in accordance with the presence of rust on the surface of the sample. That is, the corrosion resistance was considered as being "Satisfactory" when rust was not workability was considered as being "Satisfactory" when a crack did not occur at an edge of the sample in blooming.

Amount of Residual Austenite

The ratio of residual austenite was investigated by using an X-ray diffractometer.

Existence of Blowholes (Bubbles)

The existence of blowholes may be an impediment to manufacture of final products. After the ingot was cut, the cut surface was polished with an emery paper No. 1000. The existence of blowholes was checked by visually observing the polished surface.

The results of the above tests are shown in Table 2.

TABLE 2

Test results

| | Hardness (HRC) | Corrosion resistance | Existence of $M_{23}C_6$ type carbides | Hot workability | Residual austenite (%) | Existence of blowholes |
|---|---|---|---|---|---|---|
| Practical example 1 | 60 | Satisfactory | not recognized | Satisfactory | 7.3 | not recognized |
| Practical example 2 | 60 | Satisfactory | not recognized | Satisfactory | 6.5 | not recognized |
| Practical example 3 | 61 | Satisfactory | not recognized | Satisfactory | 6.7 | not recognized |
| Practical example 4 | 62 | Satisfactory | not recognized | Satisfactory | 6.3 | not recognized |
| Practical example 5 | 62 | Satisfactory | not recognized | Satisfactory | 6.5 | not recognized |
| Comparative example 1 | 56 | Satisfactory | not recognized | Satisfactory | 7.5 | not recognized |
| Comparative example 2 | 60 | Satisfactory | not recognized | Unsatisfactory | 7.3 | not recognized |
| Comparative example 3 | 60 | Unsatisfactory | not recognized | Satisfactory | 16.5 | not recognized |
| Comparative example 4 | 60 | Unsatisfactory | not recognized | Satisfactory | 6.8 | not recognized |
| Comparative example 5 | 57 | Unsatisfactory | recognized | Satisfactory | 7.1 | recognized |
| Comparative example 6 | 59 | Unsatisfactory | not recognized | Satisfactory | 6.8 | not recognized |
| Comparative example 7 | 60 | Satisfactory | not recognized | Unsatisfactory | 7.3 | not recognized |
| Comparative example 8 | 58 | Unsatisfactory | not recognized | Satisfactory | 7.1 | not recognized |
| Comparative example 9 | 61 | Satisfactory | not recognized | Unsatisfactory | 13.3 | recognized |
| Comparative example 10 | 58 | Satisfactory | not recognized | Satisfactory | 7.2 | not recognized |
| Comparative example 11 | 61 | Satisfactory | not recognized | Unsatisfactory | 7.6 | not recognized |
| Comparative example 12 | 60 | Satisfactory | not recognized | Satisfactory | 20.6 | not recognized |
| Comparative example 13 | 60 | Satisfactory | not recognized | Satisfactory | 18.3 | not recognized |

According to Table 2, the samples of the practical examples 1 to 5 had not less than HRC 60 hardness after heat treatment. In particular, when the amount of B was not less than 0.0026%, the hardness was very high corresponding to HRC 62. Thus, B improves the hardenability (facilitates martensitic transformation) and precipitates BN, whereby high strength is obtained. The samples of the practical examples 1 to 5 exhibited good corrosion resistance and did not generated $M_{23}C_6$ type carbides. Moreover, these samples had good hot workability, residual austenite limited in a range of 6 to 7%, and no blowholes. On the other hand, the sample of comparative example 1 showed a low hardness after heat treatment (HRC 56) because the amount of C was as small as 0.28% whereby quenching was not sufficiently performed (martensitic transformation did not sufficiently occur). In the sample of the comparative example 2, since the amount of Si was as high as 0.25%, cracks occurred at an edge of the sample in blooming, indicating that hot workability was unsatisfactory. In this sample, since B was added at 0.0018%, the hardness was as high as HRC 60. In the sample of the comparative example 3, the hardness after heat treatment was also high (HRC 60). However, in this sample, since the amount of Mn was 0.38% which was too large, rust occurred at more than 5% by area ratio, and the amount of residual austenite was increased to 16.5%. In this sample, B was added at 0.0017%, whereby the hardness was high (HRC 60). The sample of the comparative example 4 also exhibited a high hardness (HRC 60) after heat treatment. On the other hand, rust occurred and corrosion resistance was unsatisfactory in this sample, because the amount of Cr was as small as 13.9%. In the sample of the comparative example 4, since B was added at 0.0018%, the hardness was as high as HRC 60.

In the sample of the comparative example 5, the amount of Cr was 17.8% which was too high, whereby $M_{23}C_6$ type carbides were precipitated, and both hardness after heat treatment and corrosion resistance were deteriorated. As a result, the hardness after heat treatment was low (HRC 57), and the corrosion resistance was unsatisfactory. Moreover, blowholes were generated in this sample, because the amount of N of 0.26% was excessive. In the sample of the comparative example 6, the amount of Mo was 1.30% which was too low, whereby the hardenability was not improved, and the hardness after heat treatment remained lower than HRC 60. Moreover, in this sample, rust occurred at more than 20% by area ratio, indicating that the corrosion resistance was unsatisfactory. In the sample of the comparative example 7, since the amount of Mo of 4.00% was too high, the toughness was decreased and thereby cracks were generated at an edge in blooming, whereby hot workability was unsatisfactory. On the other hand, in this sample, since B was added at 0.0016%, the hardness was as high as HRC 60.

In the sample of the comparative example 8, the amount of N was 0.13% which was too low, whereby the hardness after heat treatment was low (HRC 58). Moreover, rust occurred in this sample, meaning that corrosion resistance was unsatisfactory. In the sample of the comparative example 9, since B was added at 0.0016%, the hardness after heat treatment was high (HRC 61), but blowholes were generated because the amount of N was excessive (0.29%). Moreover, in this sample, the hot workability was unsatisfactory because cracks were generated at an edge in blooming, and the amount of residual austenite was increased to 13.3%.

In the sample of the comparative example 10, the total of CW and NW was 0.61%, but the amount of B was 0.0009% which was low, whereby sufficient hardness was not obtained, and the hardness after heat treatment was low (HRC 58). In the sample of the comparative example 11, the total of CW and NW was 0.65% and the hardness after heat treatment was HRC 61. However, in this sample, since the amount of B was excessive (0.0031%), cracks were generated at an edge in blooming, and the hot workability was unsatisfactory.

In the samples of the comparative examples 12 and 13, the austenite stabilizing elements Ni and Cu were added, whereby the amounts of residual austenite became high. Usually, when the amount of the residual austenite is more than 10%, the dimensions of a material will vary with age in practical use (for example, transformation from austenite to martensite may occur). Regarding bearings used in precision equipments, any dimensional change of the bearing may greatly affect the measurement accuracy or working accuracy of the equipments. Accordingly, it is preferable to avoid the addition of Ni and Cu which may generate more than 10% of residual austenite.

A ball bearing 10 using a martensitic stainless steel according to the present invention is shown in FIG. 1 as a practical example 6. The ball bearing 10 includes an inner ring 11, an outer ring 12, balls (rolling elements) 13, and a holder 14. The ball bearing 10 has an inner space (a space between the inner ring 11 and the outer ring 12), and the inner space is filled with an appropriate amount of grease. The grease is sealed by seals 15 mounted to the both sides of the ball bearing 10. When corrosion resistance is required, high chromium martensitic stainless steel having sufficient hardness for antifriction bearings may be used for metal components such as an inner ring, an outer ring, and rolling elements. For antifriction bearings, not less than HRC 58 hardness is generally required.

Figure 2:
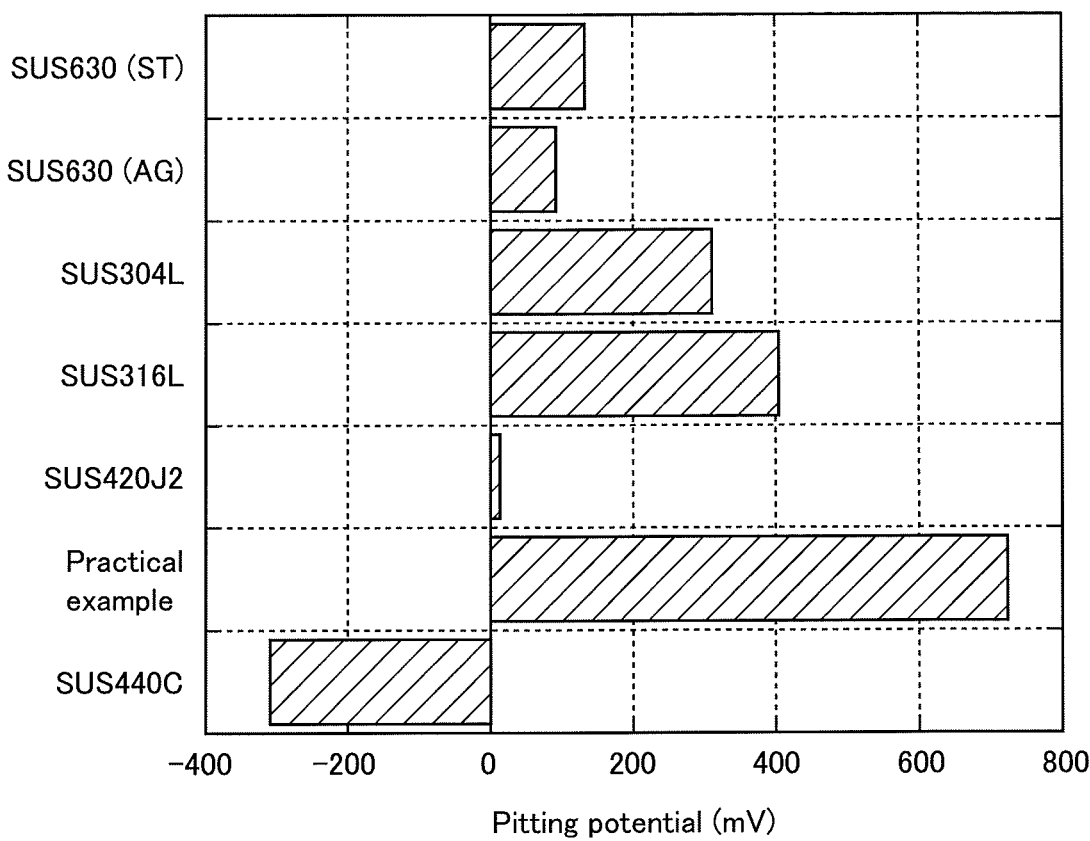
FIG. 2 is a graph showing results of relative measurement of pitting potential performed in a practical example.

Next, pitting potential of the stainless steel of the practical example 3 and pitting potentials of conventional various stainless steels were measured. The kind of stainless steels and the measurement results are shown in FIG. 2. Pitting potential is one of the indicators for corrosion resistance, and higher positive values represent superior corrosion resistance. As is clearly shown in FIG. 2, compared with the conventional stainless steels, the stainless steel of the practical example 3 exhibited a higher value of pitting potential and had superior corrosion resistance in comparison to that of austenitic SUS316L which is conventionally considered to have good corrosion resistance.

In the martensitic stainless steel of the present invention, hardness of not less than HRC 60 can be obtained by performing quenching, sub-zero treatment and tempering. Therefore, the martensitic stainless steel of the present invention is suitably used for bearings such as slide bearings and antifriction bearings that are required to have corrosion resistance. The above-described ball bearing 10 is a bearing made entirely of stainless steel, wherein the inner ring 11, the outer ring 12, and the balls 13 are made of the martensitic stainless steel of the practical example 4. In the martensitic stainless steel of the practical example 4, the hardness was as high as HRC 62, and the amount of residual austenite was as low as 6.3%.

Therefore, by using the martensitic stainless steel of the practical example 4, a ball bearing with long service life, small dimensional change with age, superior fatigue life, superior acoustic characteristics and high corrosion resistance is obtained.

Such a bearing is suitable for a bearing of a product subjected to a corrosive environment which may cause adhesion of moisture or salt, such as a submersible pump and a fishing reel. The ball bearing of the practical example 6 is made so that all of the inner ring, the outer ring, and the rolling elements are made of the martensitic stainless steel of the present invention. However, if high corrosion resistance is not required, the use of the martensitic stainless steel of the present invention in at least one of the baring components may be sufficient for producing a bearing with satisfactory characteristics. In this case, for example, the balls 13 may be made of SUJ2 steel.

What is claimed is:

1. An antifriction bearing comprising:
   an inner ring;
   an outer ring; and
   a rolling element,
   wherein at least one of the inner ring, the outer ring, and the rolling element is made of a martensitic stainless steel consisting essentially of, by weight %, 0.35 to 0.45% of C, less than 0.2% of Si, not more than 0.3% of Mn, not more than 0.02% of P, not more than 0.02% of S, 15 to 17% of Cr, 1.5 to 2.5% of Mo, 0.001 to 0.003% of B, 0.015 to 0.25% of N, 0.1 to 0.2% of W, and the balance of Fe and inevitable impurities, wherein BN is precipitated but $M_{23}C_6$ type Carbide is not precipitated in the martensitic stainless steel.

2. The antifriction bearing according to claim 1, wherein, when the amount of C is represented as CW and the amount of N is represented as NW, the total of CW and NW is in a range of 0.60 to 0.65%.

3. The antifriction bearing according to claim 1, wherein the amount of Si is not more than 0.18 weight %.

4. The antifriction bearing according to claim 1, wherein the amount of Mn is 0.25 weight % or more and the martensitic stainless steel includes 7.3% or less of residual austenite.

5. The antifriction bearing according to claim 1, wherein the martensitic stainless steel has a hardness of not less than HRC 60.

6. A martensitic stainless steel consisting essentially of, by weight %, 0.35 to 0.45% of C, less than 0.2% of Si, not more than 0.3% of Mn, not more than 0.02% of P, not more than 0.02% of S, 15 to 17% of Cr, 1.5 to 2.5% of Mo, 0.001 to 0.003% of B, 0.15 to 0.25% of N, 0.1 to 0.2% of W, and the balance of Fe and inevitable impurities, wherein BN is precipitated but $M_{23}C_6$ type Carbide is not precipitated in the martensitic stainless steel.

7. The martensitic stainless steel according to claim 6, wherein, when the amount of C is represented as CW and the amount of N is represented as NW, the total of CW and NW is in a range of 0.60 to 0.65%.

8. The martensitic stainless steel according to claim 6, wherein the amount of Si is not more than 0.18 weight %.

9. The martensitic stainless steel according to claim 6, wherein the amount of Mn is 0.25 weight % or more and the martensitic stainless steel includes 7.3% or less of residual austenite.

10. The martensitic stainless steel according to claim 6, wherein the martensitic stainless steel has a hardness of not less than HRC 60.

* * * * *